United States Patent
Pyle et al.

(10) Patent No.: US 11,816,512 B2
(45) Date of Patent: *Nov. 14, 2023

(54) EVENT DRIVEN DATA PROCESSING SYSTEM AND METHOD

(71) Applicant: CURANTIS SOLUTIONS, Addison, TX (US)

(72) Inventors: Benjamen Pyle, Addison, TX (US); Rakesh Sanghvi, Addison, TX (US); Robert Parker Freeburg, II, Addison, TX (US)

(73) Assignee: CURANTIS SOLUTIONS, Addison, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/874,282

(22) Filed: Jul. 26, 2022

(65) Prior Publication Data

US 2023/0015780 A1    Jan. 19, 2023

Related U.S. Application Data

(63) Continuation of application No. 17/378,345, filed on Jul. 16, 2021, now Pat. No. 11,429,460.

(51) Int. Cl.
*G06F 9/54*     (2006.01)
*G06F 9/46*     (2006.01)

(52) U.S. Cl.
CPC ................... *G06F 9/542* (2013.01); *G06F 9/466* (2013.01)

(58) Field of Classification Search
CPC .......... G06F 9/4812; G06F 9/542; G06F 9/546

USPC .................................................. 719/314, 318
See application file for complete search history.

(56) References Cited

U.S. PATENT DOCUMENTS

| | | | |
|---|---|---|---|
| 10,579,445 B2 | 3/2020 | Oravivattanakul et al. | |
| 2004/0078440 A1* | 4/2004 | Potter et al. ........... | G06Q 10/10 709/206 |
| 2017/0134243 A1 | 5/2017 | Lévesque et al. | |
| 2021/0271522 A1* | 9/2021 | Butterworth et al. | H04L 45/123 |

OTHER PUBLICATIONS

Freeburg, Robert Parker, et al., "Event Driven Data Processing System and Method," filed Jul. 16, 2021, U.S. Appl. No. 17/378,345.
Notice of Allowance dated Apr. 26, 2022, U.S. Appl. No. 17/378,345 filed on Jul. 16, 2021.

* cited by examiner

*Primary Examiner* — Andy Ho

(57) ABSTRACT

An event driven data processing system is disclosed that comprises event generators that generate events, an event queue that receives the events from the event generators, and an event router that receives the events from the event queue, and, for each event, selects a contextualizer based on an event type and transmits the event to a corresponding context queue associated with the selected contextualizer. The system also comprises context queues that receive the events from the event router and a plurality of contextualizers that receive the events from the context queues and, for each event, access context data sources, obtain additional context data, create a supplemented event, and store each supplemented event in an event datastore. The system further comprises a streaming component that streams each supplemented event from the event datastore for a period of time.

20 Claims, 4 Drawing Sheets

EVENT DRIVEN DATA PROCESSING SYSTEM AND METHOD

CROSS-REFERENCE TO RELATED APPLICATIONS

This application is a continuation of and claims priority under 35 U.S.C. § 120 to U.S. Pat. Application Serial No. 17/378,345 filed on Jul. 16, 2021, entitled "Event Driven Data Processing System and Method", by Benjamen Pyle, et al., which is incorporated herein by reference in its entirety for all purposes.

BACKGROUND

Systems can process data in many ways. For example, some systems process data in batch. Batch processing is the processing of data or transactions in a group or batch. Batch processing involves separate programs for input, process, and output. In another example, some systems processing data in real time. In contrast to batch processing, real time data processing involves a continual input, process, and output of data, and data is processed in a small period (or near real time).

SUMMARY

In an embodiment, an event driven data processing system is disclosed. The event driven data processing system comprising a plurality of event generators stored in a non-transitory memory that when executed by a processor generate a plurality of events and an event queue configured to receive the plurality of events from the plurality of event generators. The event driven data process system also comprises an event router stored in a non-transitory memory that when executed by a processor receives the plurality of events from the event queue. For each event of the plurality of events, the event router selects a contextualizer of a plurality of contextualizer based on an event type associated with the event, and transmits the event to a corresponding context queue associated with the selected contextualizer. The event driven data processing system additionally comprises a plurality of context queues including the corresponding context queue configured to receive the plurality of events from the event router. The event driven data processing system further comprises the plurality of contextualizers stored in a non-transitory memory that when executed by a processor receives the plurality of events from the plurality of context queues, for each event of the plurality of events, accesses a plurality of context data sources and obtain additional context data for the event, creates a supplemented event for each event of the plurality of events by adding the additional context data to the event, and stores each supplemented event created in an event datastore. The event driven data processing system also comprises a streaming component stored in a non-transitory memory that when executed by a processor streams each supplemented event from the event datastore for a period of time. At least one streamed supplemented event is accessed by or provided to at least one of a consumer device, a webhook, an application programming interface, or a database.

In another embodiment, a method for event driven data processing is disclosed. The method comprising receiving, by an event queue, an event from an event generator, receiving, by an event router stored in a non-transitory memory and executable by a processor, the event from the event queue, and determining, by the event router, that the event is to be multicast. The method also comprises routing, by the event router, the event to a multicast queue, receiving, by a multicast component stored in a non-transitory memory and executable by a processor, the event from the multicast queue, and creating, by the multicast component, a plurality of different events based on the event and based on a client configuration. The method additionally comprises transmitting, by the multicast component, the plurality of different events to the event queue and receiving, by the event router, the plurality of different events from the event queue. The method further comprises, for each event of the plurality of different events, selecting, by the event router, a contextualizer of a plurality of contextualizer based on an event type associated with the event, transmitting, by the event router, the event to a corresponding context queue associated with the selected contextualizer, receiving, by the selected contextualizer, the event from the corresponding context queue, and accessing, by the selected contextualizer, a plurality of context data sources to obtain additional context data for the event. The method also comprises, for each event of the plurality of different events, creating, by the selected contextualizer, a supplemented event for the event by adding the additional context data to the event, storing, by the selected contextualizer, the supplemented event created in an event datastore, and streaming, by a streaming component stored in a non-transitory memory and executable by a processor, the supplemented event from the event datastore for a period of time. At least one streamed supplemented event is accessed by or provided to at least one of a consumer device, a webhook, an application programming interface, or a database.

In yet another embodiment, a method for event driven data processing is disclosed. The method comprising receiving, by an event queue, a plurality of events from a plurality of event generators, wherein at least one of the plurality of events comprises a redrive event, receiving, by an event router stored in a non-transitory memory and executable by a processor, the plurality of events from the event queue, and routing, by the event router, the redrive event to a redrive queue. The method also comprises receiving, by a redrive component stored on a non-transitory memory and executable by a processor, the redrive event, searching, by the redrive component, for a subset of events in an event datastore impacted by the redrive event; modifying, by the redrive component, the subset of events based on the redrive event, and transmitting, by the redrive component, the modified subset of events to the event queue. The method additionally comprises receiving, by the event router, the modified subset of events from the event queue, selecting, by the event router, at least one contextualizer based on an event type associated with the modified subset of events, and transmitting, by the event router, the modified subset of events to at least one corresponding context queue associated with the at least one contextualizer. The method further comprises receiving, by the at least one contextualizer stored in a non-transitory memory and executable by a processor, the modified subset of events from the at least one corresponding context queue, processing, by the at least one contextualizer, the modified subset of events, subsequently storing, by the at least one contextualizer, the modified subset of events in the event datastore, and streaming, by a streaming component stored in a non-transitory memory and executable by a processor, the modified subset of events from the event datastore for a period of time. At least one streamed modified event is accessed by or provided to at least one of a consumer device, a webhook, an application programming interface, or a database.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
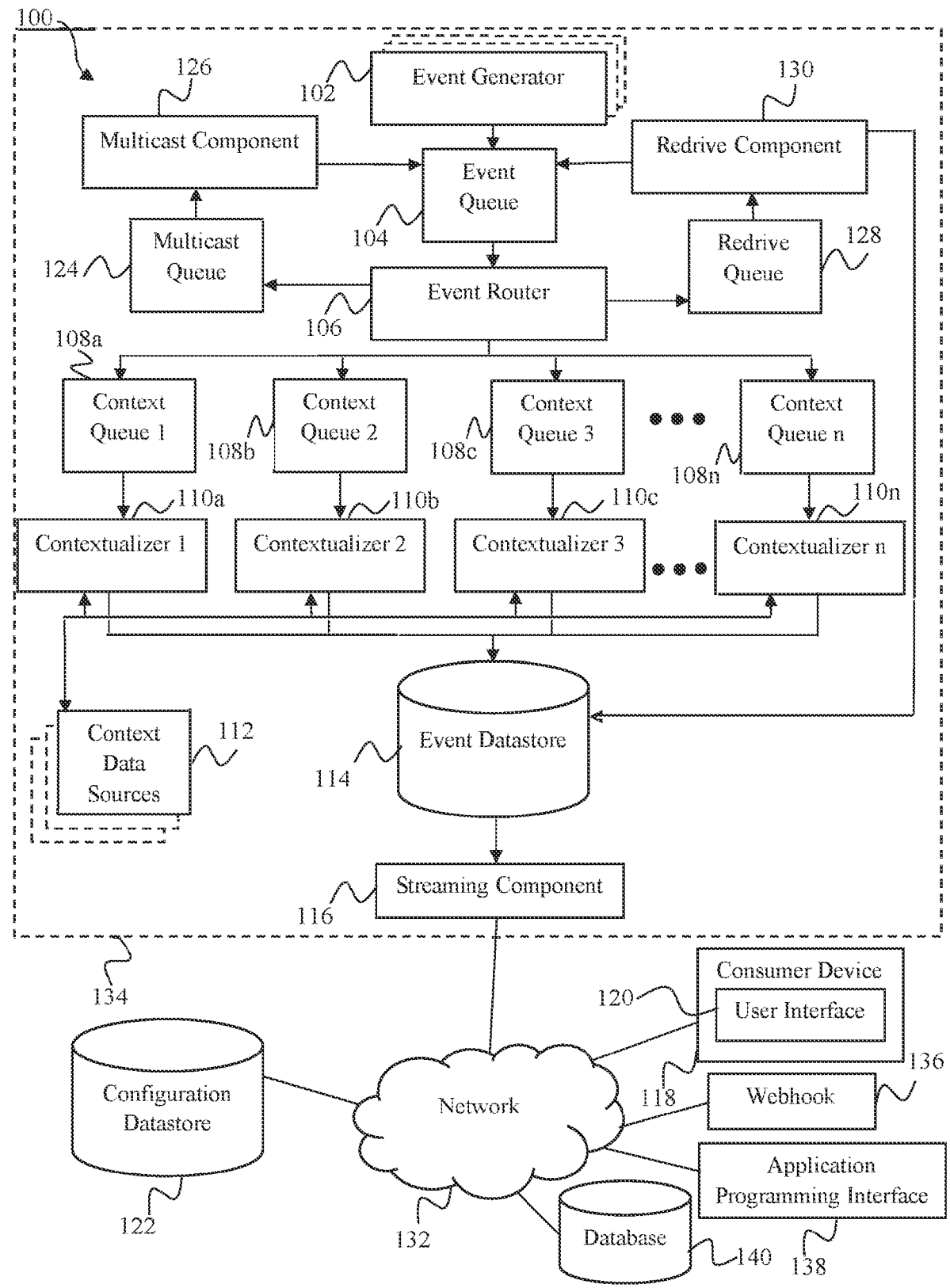
FIG. 1 is a block diagram of an event driven data processing system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending application is directed to an event driven data processing system. The event driven data processing system disclosed herein is a robust, multi-use system offering near real time processing of events. The event driven data processing system may be cloud based and created using various Amazon technology/tools. While described below in reference to use of the event driven data processing system within a hospice care and/or palliative care organization, the event driven data processing system may be used in other medical care organizations or organizations not associated with medical care.

Within the event driven data processing system disclosed herein, events may be fed into an event queue and on to an event router. The event router may be preprogrammed with rules to analyze the events and determine where the event should go next. Some of the preprogrammed rules may be consumer specific or consumer specified. The event router has the capability to process events in a plurality of different ways. For example, the event router may recognize, based on the preprogrammed rules, that an event should be converted into multiple events and feed such an event to a multicast queue. For example, a rule could be programmed into the event router that a visit completed event is to be sent to a multicast queue and converted into a plurality of different events. A multicast component may receive the instructions from the event router and convert the single event into multiple events and feed the multiple events back into the event queue and on to the event router. A problem may arise in that the multicast component may continue to try to multicast events that have already been multicast. To address this problem, when the multiple events created by the multicast component are fed back to the event router, the event driven data processing system disclosed herein may include an internal message structure that informs the event router that these events have already been multicast so that the event router does not send any of the plurality of different events back to the multicast component. The coordinated, streamlined approach to event processing performed by the multicast component where a single event can be turned into a plurality of different events promotes efficiency in terms of resource usage, time, and cost. In the past, different systems may have had to process different events resulting in higher processing burdens for those systems and little to no coordination between those systems and their event processing.

The event router may receive duplicate events from one or more event generators. Rather than waste resources processing and storing duplicate events, the event router may apply a de-duplication rule. The de-duplication rule may be applied to events from a particular component that has been sending duplicate events to the event router. Based on the de-duplication rule, the event router may wait a preset amount of time in response to receiving an event before forwarding on the event to its next destination. If the event router receives one or more duplicate events within the preset amount of time, the event router will discard the duplicate events and then forward the event on to its next destination, thereby saving processing and storage resources.

The event router may route events to one of a plurality of different context queues associated with one of a plurality of different contextualizers based on the type of event. The plurality of different context queues and contextualizers may comprise (1) a billing queue/billing contextualizer, (2) a user activity queue/user activity contextualizer, (3) a patient biometrics queue/patient biometrics contextualizer, (4) an alerts queue/alerts contextualizer, and/or other queues/contextualizers. This compartmentalized contextualizer approach based on event type as opposed to a single contextualizer results in processing efficiencies as well as cost savings. These processing efficiencies arise because the event driven data processing system includes smaller, more focused executables (contextualizers) that execute when an event is placed on their queue as opposed to a single, larger executable (contextualizer) that executes with every event. Additional instances of each contextualizer may be spun up as needed (e.g., via Amazon's technology/tools) to support event loads. As the event loads lessen, the additional instances of the contextualizer(s) can be torn down (e.g., via Amazon's technology/tools).

Each contextualizer may receive the routed event and leverage that event through multiple context data sources/microservices to add context to that event and pass the supplemented event down the line to its next destination. For example, in the billing context, a billing event may arrive at a billing contextualizer with seven or so fields and leave the billing contextualizer with more than 120 fields after being supplemented. The goal with supplementing the event or contextualizing the event is that all of the relevant data needed by the end consumer will be included within the supplemented event such that the end consumer does not have to try to track down additional information/data. Each of the contextualizers may feed the supplemented events into an events table or ledger in a key-value data store. The events table may store multiple event types and keys for searching the events table. This events table may be an immutable data store. If the same event is passed from the contextualizer to the events table, it may be saved by the event driven data processing system as a different version in the events table. This may occur for example if there is a change to the initial event such as a rate in the billing context.

In the event that there is a change to an initial event (e.g., a change in a rate for a provider in the billing context), the event driven data processing system may include a redrive queue and redrive component. The redrive component may locate all relevant events in need of updating by accessing and searching the events table. For example, in the case of a rate change for a particular provider over a period of time, the redrive component may locate all potentially relevant events associated with the particular provider during the period of time, modify the rate associated with the relevant records, and feed the modified events back into the event queue and on to the event router. These modified events may be supplemented by the corresponding contextualizer by accessing various context data sources/microservices and stored in the event datastore as a new version of the initial events.

With batch processing systems, the identification of a need to fix data associated with an event because of an issue (e.g., a visit was coded incorrectly) and the ability to fix such data may not come to light until the end of the month when the batch of events is processed. In contrast, when data associated with an event needs to be fixed or corrected, the event driven data processing system disclosed herein enables identification of that need earlier than prior batch processing systems as events are processed in near real time and also enables action to be taken on data with context as soon as possible. Thus, the event driven data processing system enables handling of change in near real time via the redrive component.

As the supplemented events are stored in the events table, the supplemented events may be transmitted to a temporary storage component where they are stored for a predetermined amount of time. For example, a streaming component may receive and stream the supplemented events for a predetermined amount of time. Various consumers (e.g. billing consumer(s), alert consumer(s), user activity consumer(s), patient biometrics consumer(s), etc.) may pull one or more relevant supplemented events from the temporary storage component by reading a relevant stream and analyze the associated data for their purpose. For example, a billing consumer may pull a supplemented event from the temporary storage component, analyze the associated data, and generate a bill. Each of the consumers may read off of the same stream, but each consumer is able to keep their own reference pointer. At least in the billing context, the event driven data processing system enables bills to be created (and updated if needed) dynamically and in near real-time as opposed to traditional batch processing billing systems. Further, advantageously, the streaming component allows consumer to have a "peek" of data from the stream as opposed to a full process like batch processing systems.

Turning to FIG. 1, an event driven data processing system 100 is described. The event driven data processing system 100 may comprise one or more event generators 102, an event queue 104, an event router 106, a plurality of context queues 108 including context queue 1 108a, context queue 2 108b, context queue 3 108c, and context queue n 108n, a plurality of contextualizers 110 including contextualizer 1 110a, contextualizer 2 110b, contextualizer 3 110c, and contextualizer n 110n, context data sources 112, an event datastore 114, and a streaming component 116. The event driven data processing system 100 may also comprise one or more of a consumer device 118 with a user interface 120, a webhook 136, an application programming interface 138, and/or a database 140 as well as comprise a configuration datastore 122. The event driven processing system 100 may additionally comprise a multicast queue 124, a multicast component 126, a redrive queue 128, and a redrive component 130. Further, the event driven processing queue 100 may comprise a network 132. In an embodiment, each of the event generator(s) 102, event queue 104, event router 106, context queues 108, contextualizers 110, context data sources 112, event datastore 114, streaming component 116, multicast queue 124, multicast component 126, redrive queue 128, and redrive component 130 operate in a virtual private cloud 134.

The event generator(s) 102, event queue 104, event router 106, context queues 108, contextualizers 110, context data sources 112, event datastore 114, streaming component 116, multicast queue 124, multicast component 126, redrive queue 128, and redrive component 130 may be implemented using various Amazon technologies. In some embodiments, the virtual private cloud 134 is an Amazon virtual private cloud.

The event generator(s) 102 may generate events. The events may be user generated events. For example, the user generated events may be that a user logs into the platform, a user submits a patient visit, a user submits a report, or some other user activity within the system 100. The events may be billable events (e.g., a patient has an assessment performed on them), employee activity events, patient biometric events, or other events. In an embodiment, the events comprise calculation events based on data/other events within the event driven data processing system 100. For example, in the hospice environment, a calculation event may be an event for each patient "on service" for the day such that a number of patients "on service" for the day can be determined. The event queue 104 may receive the events from the event generator(s) 102.

The event router 106 receives the events from the event queue 104 and determines where to route each event. The event router 106 may be preprogrammed with rules to analyze the events and determine where the event should go next. Some of the preprogrammed rules may be consumer specific or consumer specified. The rules may be stored in the configuration datastore 122. While illustrated as outside the virtual private cloud 134, in some embodiments, the configuration datastore 122 may be within the virtual private cloud 134.

In some embodiments, the event router 106 may be preprogrammed with a de-duplication rule. The event router 106 may receive duplicate events from one or more of the event generators 102. Rather than waste resources processing and storing duplicate events, the event router 106 may apply a de-duplication rule. In an embodiment, the de-duplication rule is applied to events from a particular component that has been sending duplicate events to the event router 106. Based on the de-duplication rule, the event router 106 may wait a preset amount of time in response to receiving an event before forwarding on the event to its next destination. If the event router 106 receives one or more duplicate events within the preset amount of time, the event router 106 may discard the duplicate events and then forward the initial event on to its next destination, thereby saving processing and storage resources.

For each event, the event router 106 selects a contextualizer 110a-110n based on an event type associated with the event and transmits the event to a corresponding context queue 108a-108n associated with the selected contextualizer 110a-110n. The event types may comprise a user activity event type, a billing event type, a patient biometrics event type, an alerts event type, or another event type. In an embodiment, there is a context queue 108a-108n and a contextualizer 110a-110n corresponding to each event type. For example, context queue 1 108a and contextualizer 1 110a may receive user activity events, context queue 2 108b and contextualizer 2 110b may receive billing events, context queue 3 108c and contextualizer 3 110c may receive biometric events, and context queue n 108n and contextualizer n 110n may receive alert events. While four context queues 108 and contextualizers 110 are illustrated in FIG. 1, any number of context queues 108 and contextualizers 110 may exist in the event driven data processing system 100 without departing from the spirit or scope of the present disclosure.

The plurality of different context queues 108 and contextualizers 110 may comprise (1) a billing queue/billing contextualizer, (2) a user activity queue/user activity contextualizer, (3) a patient biometrics queue/patient biometrics contextualizer, (4) an alerts queue/alerts contextualizer, (5) an anomaly detection queue/anomaly detection contextualizer, (6) a third party queue/third party contextualizer, and/or other queues/contextualizers. This compartmentalized contextualizer approach based on event type as opposed to a single contextualizer results in processing efficiencies as well as cost savings. These processing efficiencies arise because the event driven data processing system 100 includes smaller, more focused executables (i.e., contextualizers 110) that execute when a corresponding event is placed on their context queue 108 as opposed to a single, larger executable (contextualizer) that executes with every event.

The contextualizers 110 may add context to an event and create a supplemented event. This may be accomplished by accessing a plurality of different context data sources 112 to retrieve additional related information associated with the event and add that information to the event to create a supplemented event. The context data sources 112 may comprises different microservices. In an embodiment, the contextualizers 110 retrieve the additional related information from the context data sources 112 via application programming interfaces (APIs). Each contextualizer 110a-110n may contextualize corresponding events differently depending on the type of event the contextualizer 110a-110n is responsible for. For example, contextualizer 1 110a may access one or more different context data sources 112 and/or pull one or more different pieces of information from the context data sources 112 than contextualizer 2 110b, contextualizer 3 110c, and/or contextualizer n 110n such that a supplemented event created by the contextualizer 1 110a is different than a supplemented event created by contextualizer 2 110b, contextualizer 3 110c, and/or contextualizer n 110n.

As an example of the contextualizing, in the billing context, a billing event may arrive at a billing contextualizer (e.g., contextualizer 2 110b) with a relatively small number of fields (e.g., 5-8 or some other small range) and leave the billing contextualizer with a much larger number of fields (e.g., 100 fields or more) after being supplemented with information from the context data sources 112. The context data sources 112 may be various microservices. For example, the context data sources 112 may comprise a patient chart microservice, a benefits microservice, an assessment microservice, a document managements microservice, a patient visit microservice, a company facilities microservice, or other microservices. The goal with supplementing the event or contextualizing the event using the various context data sources 112 is that all of the relevant data needed by the end consumer will be included within the supplemented event such that the end consumer does not have to try to track down additional information/data. If an event fails to process by the contextualizer 110a-110n, that event may fail over to a dead letter queue. This enables recovery if there is a failure in processing an event.

Additional instances of each contextualizer 110a-110n may be spun up to support event loads. For example, a contextualizer 110a-110n may be scaled based on a number of events processed by the contextualizer 110a-110n by creating additional instances of the contextualizer 110a-110n when the number of events processed by the contextualizer 110a-110n exceeds a threshold. As a non-limiting example, if bill event loads are above a predefined threshold, additional instances of the billing contextualizer (e.g., contextualizer 2 110b) may be spun up. As the event loads lessen (e.g. fall below a predefined threshold), the additional instances of the contextualizer 110a-110n may be torn down. The scalability of the contextualizers 110 may be enabled by Amazon's technology/tools.

In an embodiment, each of the contextualizers 110 feed the supplemented events into the event datastore 114. In an embodiment, the event datastore 114 is implemented using Amazon DynamoDB. The event datastore 114 may be a key-value data store. The event datastore 114 may store an events table or ledger. Each supplemented event may comprise a unique key determined by the contextualizer 110a-110n. The unique key for each supplemented event may vary depending on the type of event. In an embodiment, the unique comprises one or more of patient ID, day/date, provider/doctor index, tenant, month, year, employee, and/or other data. The events table may store multiple event types and keys for searching the events table. The event datastore 114 may be an immutable datastore. If the same event is passed from the contextualizer 110a-110n to the event datastore 114, it may be saved by the event driven data processing system 100 as a different version in the events table. This may occur for example if there is a change to the initial event such as a rate in the billing context.

As the supplemented events are stored in the event datastore 114, the supplemented events may be transmitted to the streaming component 116. While not illustrated in FIG. 1, there may be a stream reader between the event datastore 114 and the streaming component 116 such that the supplemented events flow from the event datastore 114 to the stream reader to the streaming component 116. In an embodiment, the streaming component 116 is implemented using Amazon Kinesis. The streaming component 116 may receive and stream the supplemented events for a predetermined amount of time (e.g., one to seven days or some other time period). In an embodiment, the streaming component 116 streams new entries from the event data store using a single stream regardless of event type associated with the new entry. In alternative embodiments, the streaming component 116 may stream new entries from the event data store using a plurality of streams. For example, the streaming component 116 may stream new bill events in a first stream, new activity events in a second stream, and so on for each different event type. In another example, the streaming component 116 may have dedicated streams dependent on the end consumer rather than event type.

Consumer devices 118 may access and read relevant supplemented events from the stream. In an embodiment, each consumer device 118 filters the stream of events for relevant data. The consumer devices 118 may be associated with various consumers such as billing consumer(s), alert consumer(s), user activity consumer(s), patient biometrics consumer(s), or another consumer. The consumer devices 118 may analyze the data read from the stream for the consumer's purpose. For example, a billing consumer may pull a supplemented event from the stream, analyze the associated data, and generate a bill. In another example, an alert consumer may pull one or more supplemented events from the stream, analyze the associated data, and issue an alert such as an alert about a patient's health, an alert about an updated bill, or another type of alert. Each of the consumer devices 118 may comprise a user interface 120 to enable a user of the consumer device 118 to view the data read from the stream. The consumer devices 118 may be computers or other types of electronic devices. General purpose computers are discussed below in more detail with respect to FIG. 3. In an embodiment, each of the consumer devices 118 read off of the same stream produced by the streaming component 116, but each consumer device 118 is able to keep their own reference pointer. Thus, in such an embodiment, if a first consumer device 118 accesses data at a first point in the stream and a second consumer device 118 accesses data in a second point in the stream, the first and second consumer device 118 would each have separate reference pointers to allow them to keep their point within the stream.

In some embodiments, other components may receive relevant events from the streaming component 116 instead of or in addition to the consumer device 118. For example, relevant data from the streaming component 116 may be sent to a webhook 136, an application programming interface 138, and/or a database 140. While only one database 140 is illustrated, in some embodiments, there may be a plurality of databases 140, and the databases 140 may be different types of databases depending on the particular type of data being sent to the respective database. For example, there may be a database for the billing data streaming from the streaming component 116, a database for biometrics streaming from the streaming component 116, a database for alerts streaming from the streaming component 116, and/or a database for user activity data streaming from the streaming component 116.

In some embodiments, the event driven data processing system 100 comprises the multicast queue 124 and the multicast component 126. As discussed above, the event router 106 may be preprogrammed with rules to analyze the events and determine where the event should go next. The event router 106 may have the capability to process events in a plurality of different ways beyond just passing the event to a selected context queue 108a-108n/contextualizer 110a-110n. For example, the event router 106 may recognize, based on the preprogrammed rules, that an event should be converted into multiple events and feed such an event to the multicast queue 124. As a non-limiting example, a rule could be programmed into the event router 106 that a visit completed event is to be sent to the multicast queue 124 and converted into a plurality of different events (e.g., a billable claim, an employee activity record, a record to be run through a machine learning anomaly detection algorithm, etc.). The multicast component 126 may receive the instructions from the event router 106 and convert the single event stored in the multicast queue 124 into multiple events and feed the multiple events back into the event queue 104 and on to the event router 106. When the multiple events are fed back to the event router 106, the event driven data processing system 100 may include an internal message structure that will let the event router 106 know that this event has already been multicast so that the event router 106 does not send any of the plurality of different events back to the multicast queue 124 and on to the multicast component 126.

In some embodiments, the event driven data processing system 100 comprises the redrive queue 128 and the redrive component 130. The redrive queue 128 and the redrive component 130 may come into play when there is a change to an initial event (e.g., a change in a rate for a provider in the billing context). In response to a redrive event, the event router 106 may route the redrive event to the redrive queue 128. Based on the redrive event stored on the redrive queue 128, the redrive component 130 may locate all relevant events in need of updating by accessing and searching the event datastore 114. For example, in the case of a rate change for a particular provider over a period of time, the redrive component 130 may locate all potentially relevant events associated with the particular provider during the period of time, modify the rate associated with the relevant records, and feed the modified events back into the event queue 104 and on to the event router 106. These modified events may be supplemented by the corresponding contextualizer 110a-110n by accessing the context data sources 112 and stored in the event datastore 114 as a new version of the initial events. In an alternative embodiment, rather than accessing and searching the event datastore 114, the redrive component 130 may access and search a snapshot of the events table stored in the event datastore 114.

The event driven data processing system 100 is a real time data processing system or near real time data processing system. For example, in the event driven data processing system 100 disclosed herein, an event may progress from event generation through the platform to a consumer in less than about half of a second. Thus, the event driven data processing system 100 enables action to be taken on data with context (i.e., the supplemented event) as soon as possible rather than waiting for example to the end of the month to determine via batch processing system that there is an issue (e.g., a visit was coded incorrectly). If a change is needed to a subset of events, the event driven data processing system 100 enables handling of such change in near real time via the redrive component 130.

The network 132 promotes communication between the components of the event driven data processing system 100. The network 132 may be any communication network including a public data network (PDN), a public switched telephone network (PSTN), a private network, and/or a combination.

Figure 2A:
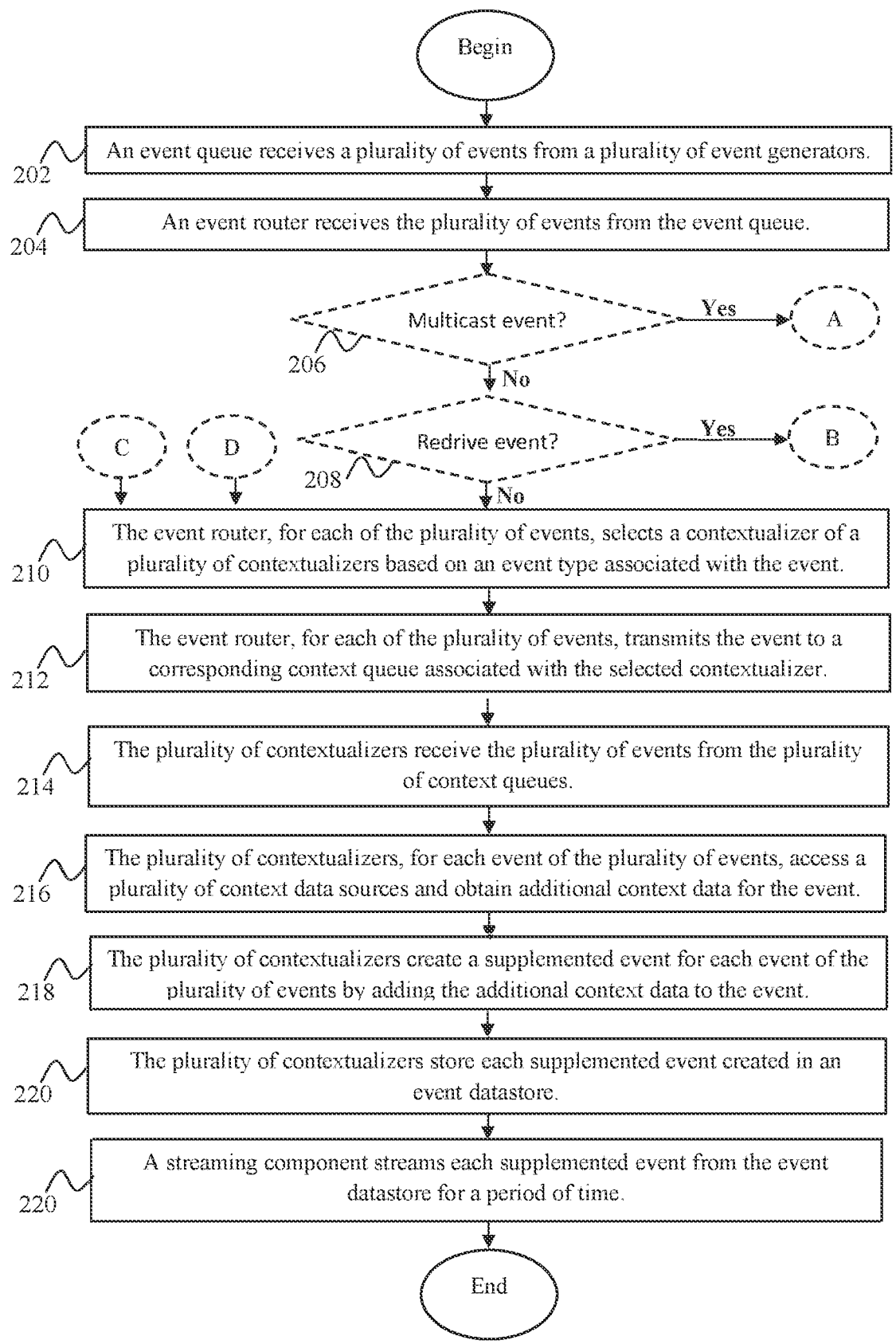
FIGS. 2A-2C are a flow chart of a method according to an embodiment of the disclosure.
Figure 2B:
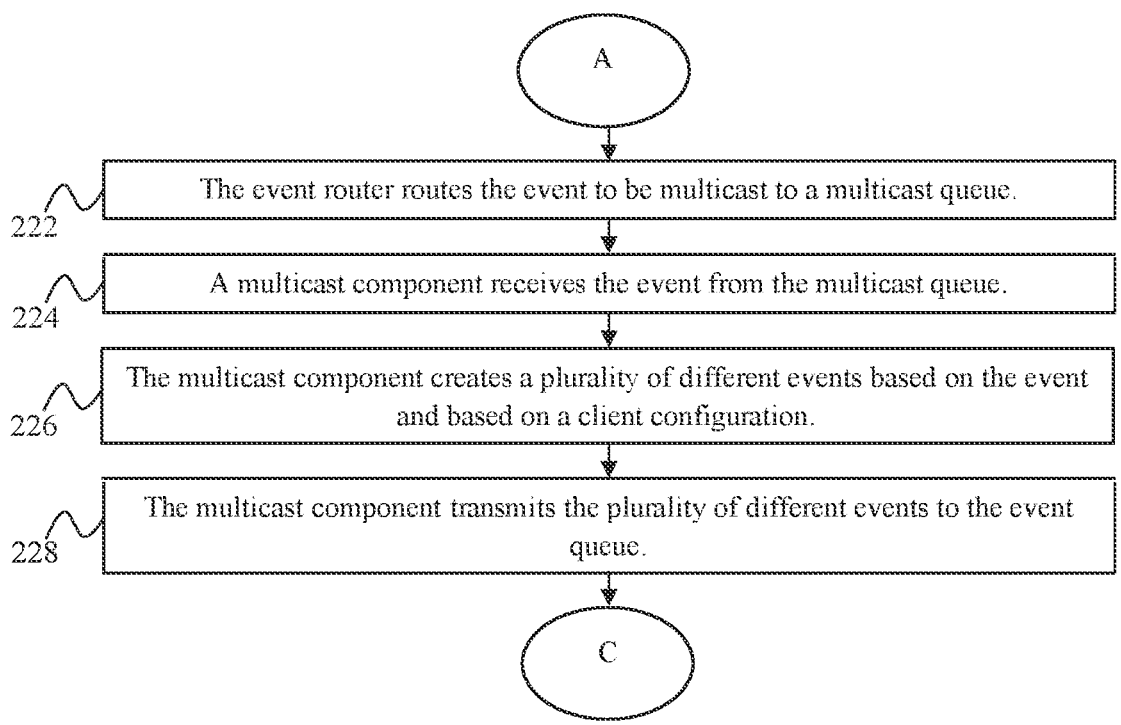
Figure 2C:
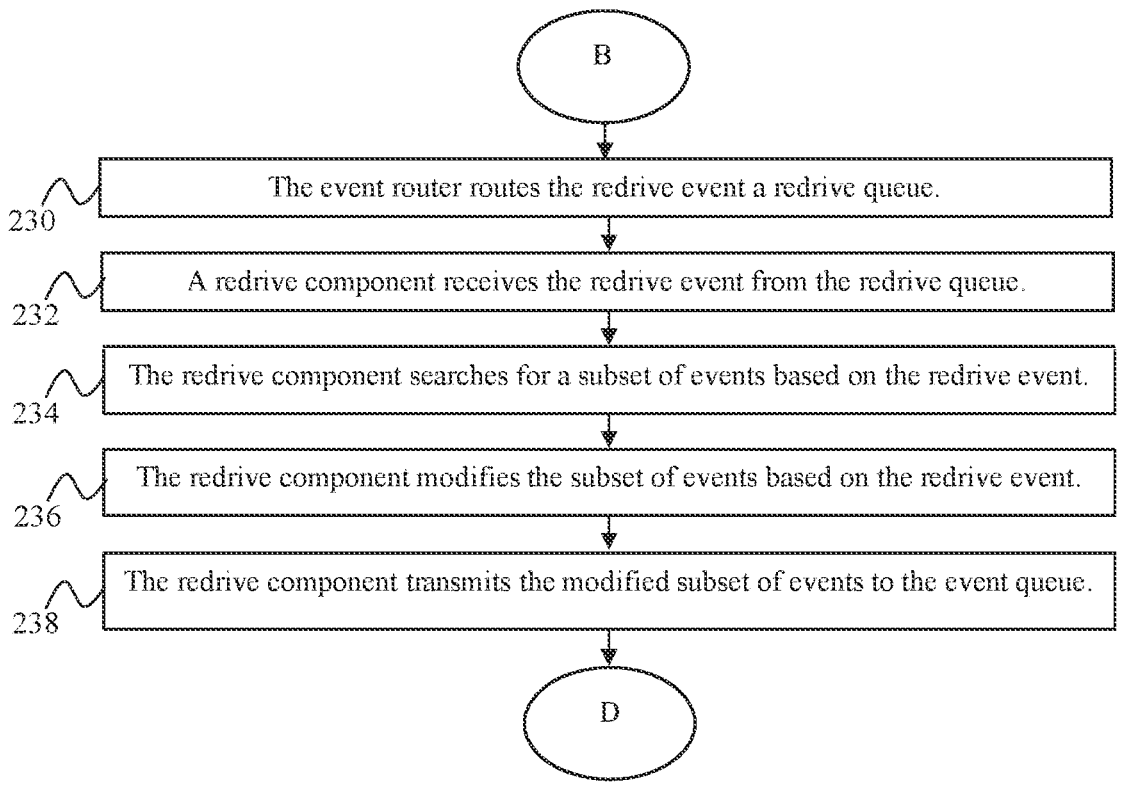

Turning now to FIGS. 2A, 2B, and 2C, an event driven data processing method is described. At block 202, an event queue (e.g., event queue 104) receives a plurality of events from a plurality of event generators (e.g., event generators 102). At block 204, an event router (e.g., event router 106) receives the plurality of events from the event queue. At block 206, the event router determines if the event is a multicast event. At block 208, the event router determines if the event is a redrive event. Blocks 206 and 208 can occur in any order. If the event is not a multi-cast event or a redrive event at blocks 206 and 208, at block 210, the event router, for each of the plurality of events, selects a contextualizer of a plurality of contextualizers (e.g., contextualizers 110a-110n) based on an event type associated with the event. At block 212, the event router, for each of the plurality of events, transmits the event to a corresponding context queue (e.g., context queue 108a-108n) associated with the selected contextualizer.

At block 214, the plurality of contextualizers receive the plurality of events from the plurality of context queues. At block 216, the plurality of contextualizers, for each event of the plurality of events, access a plurality of context data sources (e.g., context data sources 112) and obtain additional context data for the event. At block 218, the plurality of contextualizers create a supplemented event for each event of the plurality of events by adding the additional context data to the event. At block 220, the plurality of contextualizers store each supplemented event created in an event datastore (e.g., event datastore 114). At block 220, a streaming component (e.g., streaming component 116) streams each supplemented event from the event datastore for a period of time.

Returning now to block 206, if the event router determines that the event is a multicast event, at block 222 represented in FIG. 2B, the event router routes the event to a multicast queue (e.g., multicast queue 124). At block 224, a multicast component (e.g., multicast component 126) creates a plurality of different events based on the event and based on a client configuration (e.g., client specified rules in the configuration datastore 122). At block 228, the multicast component transmits the plurality of different events to the event queue, and the method picks up at block 210 in FIG. 2A with the event router selecting a contextualizer for each event.

Returning now to block 208, if the event router determines that the event is a redrive event, at block 230 represented in FIG. 2C, the event router routes the event to a redrive queue (e.g., redrive queue 128). At block 232, a redrive component (e.g., redrive component 130) receives the redrive event from the redrive queue. At block 234, the redrive component searches for a subset of events based on the redrive event. In some embodiments, the redrive component searches the event datastore 114 or a snapshot of the events table in the event datastore 114 for the subset of events. At block 236, the redrive component modifies the subset of events based on the redrive event. At block 238, the redrive component transmits the modified subset of events to the event queue, and the method picks up at block 210 in FIG. 2A with the event router selecting a contextualizer for each event.

Figure 3:
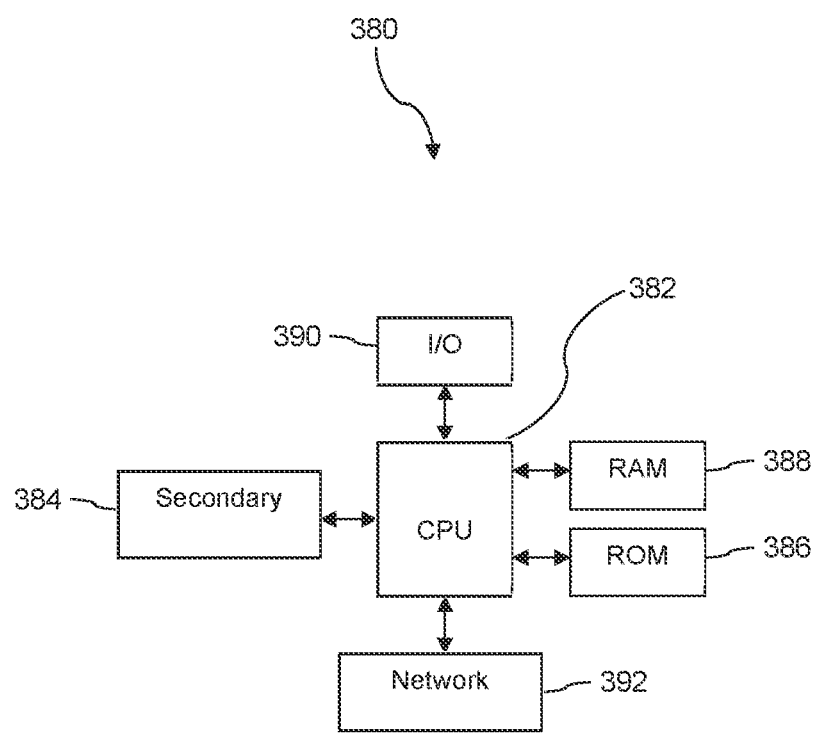
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An event driven data processing system, comprising:
an event queue configured to receive an event from an event generator;
an event router stored in a non-transitory memory that when executed by a processor:
receives the event from the event queue,
determines that the event is to be multicast, and
routes the event to a multicast queue;
a multicast component stored in a non-transitory memory that when executed by a processor:
receives the event from the multicast queue,
creates a plurality of different events based on the event and based on a client configuration, and
transmits the plurality of different events to the event queue, wherein the event router is further configured to receive the plurality of different events from the event queue and transmit each of the plurality of different events to at least one context queue;
at least one contextualizer stored in a non-transitory memory that when executed by a processor:
receives one or more events of the plurality of different events from the at least one context queue,
for each event of the one or more received events:
accesses one or more context data sources to obtain additional context data for the event,
creates a supplemented event for the event by adding the additional context data to the event, and
stores the supplemented event created in an event datastore; and
a streaming component stored in a non-transitory memory that when executed by a processor streams each supplemented event from the event datastore for a period of time, wherein at least one streamed supplemented event is accessed by or provided to at least one of a consumer device, a webhook, an application programming interface, or a database.

2. The event driven data processing system of claim 1, wherein the event router determines that the event is to be multicast based on preprogrammed rules.

3. The event driven data processing system of claim 1, wherein the plurality of different events correspond to a plurality of different event types, and wherein the plurality of different event types comprise a plurality of an alert event type, a patient biometrics event type, a billing event type, or a user activity event type.

4. The event driven data processing system of claim 3, wherein a first event of the plurality of different events corresponds to a first event type and a second event of the plurality of different events corresponds to a second event type, and wherein different context data sources are accessed to obtain additional context data for the first event than the second event such that a supplemented event created for the first event is different from a supplemented event created for the second event.

5. The event driven data processing system of claim 1, wherein the at least one contextualizer is scalable depending on a number of events processed by the at least one contextualizer.

6. The event driven data processing system of claim 5, wherein additional instances of the at least one contextualizer are created when a number of events processed by the at least one contextualizer exceeds a threshold.

7. The event driven data processing system of claim 1, wherein the event router is further configured to recognize that the event has already been multicast such that the event router does not send any of the plurality of different events to the multicast queue or the multicast component.

8. The event driven data processing system of claim 1, further comprising a redrive component stored in a non-transitory memory that when executed by a processor:
receives a redrive event from a redrive queue,
searches for a subset of events in the event datastore to be modified based on the redrive event, and
creates modified events for the subset of events.

9. The event driven data processing system of claim 8, wherein each modified event is stored in the event datastore as a different version of a corresponding event of the subset of events.

10. The event driven data processing system of claim 8, wherein the subset of events comprises billing events within a time period, and wherein the redrive event comprises an instruction to change a billing rate for certain billing events within the time period.

11. A method for event driven data processing, the method comprising:
receiving, by an event queue, an event from an event generator;
receiving, by an event router stored in a non-transitory memory and executable by a processor, the event from the event queue;
determining, by the event router, that the event is to be multicast;
routing, by the event router, the event to a multicast queue;
receiving, by a multicast component stored in a non-transitory memory and executable by a processor, the event from the multicast queue;
creating, by the multicast component, a plurality of different events based on the event and based on a client configuration;
transmitting, by the multicast component, the plurality of different events to the event queue;
receiving, by the event router, the plurality of different events from the event queue;
for each event of the plurality of different events,
transmitting, by the event router, the event to a context queue associated with a contextualizer;
receiving, by the contextualizer, the event from the context queue;
accessing, by the contextualizer, one or more context data sources to obtain additional context data for the event;
creating, by the contextualizer, a supplemented event for the event by adding the additional context data to the event;
storing, by the contextualizer, the supplemented event created in an event datastore; and
streaming, by a streaming component stored in a non-transitory memory and executable by a processor, the supplemented event from the event datastore for a period of time, wherein at least one streamed supplemented event is accessed by or provided to at least one of a consumer device, a webhook, an application programming interface, or a database.

12. The method of claim 11, wherein the event router determines that the event is to be multicast based on preprogrammed rules.

13. The method of claim 11, wherein the plurality of different events correspond to a plurality of different event types, and wherein the plurality of different event types comprise a plurality of an alert event type, a patient biometrics event type, a billing event type, or a user activity event type.

14. The method of claim 13, wherein a first event of the plurality of different events corresponds to a first event type and a second event of the plurality of different events corresponds to a second event type, and wherein different context data sources are accessed to obtain additional context data for the first event than the second event such that a supplemented event created for the first event is different from a supplemented event created for the second event.

15. The method of claim 11, wherein the contextualizer is scalable depending on a number of events processed by the contextualizer.

16. The method of claim 15, wherein additional instances of the contextualizer are created when a number of events processed by the contextualizer exceeds a threshold.

17. The method of claim 11, wherein the event router recognizes that the event has already been multicast such that the event router does not send any of the plurality of different events to the multicast queue or the multicast component.

18. The method of claim 11, further comprising:

receiving, by a redrive component stored in a non-transitory memory and executable be a processor, a redrive event from a redrive queue;

searching, by the redrive component, for a subset of events in the event datastore to be modified based on the redrive event; and creating, by the redrive component, modified events for the subset of events.

19. The method of claim 18, wherein each modified event is stored in the event datastore as a different version of a corresponding event of the subset of events.

20. The method of claim 18, wherein the subset of events comprises billing events within a time period, and wherein the redrive event comprises an instruction to change a billing rate for certain billing events within the time period.

* * * * *